United States Patent
Bormann et al.

(10) Patent No.: US 12,523,973 B2
(45) Date of Patent: Jan. 13, 2026

(54) INDUCED VOLTAGE-BASED CONTROL OF A SENSOR NETWORK

(71) Applicant: SIEMENS AKTIENGESELLSCHAFT, Munich (DE)

(72) Inventors: Ulf Bormann, Altdorf (DE); Dirk Scheibner, Nuremberg (DE); Jürgen Schimmer, Nuremberg (DE); Dominik Tacke, Heroldsberg (DE); Michael Villnow, Deutschland (DE)

(73) Assignee: Siemens Aktiengesellschaft, Munich (DE)

( * ) Notice: Subject to any disclaimer, the term of this patent is extended or adjusted under 35 U.S.C. 154(b) by 358 days.

(21) Appl. No.: 17/771,926

(22) PCT Filed: Oct. 9, 2020

(86) PCT No.: PCT/EP2020/078439
§ 371 (c)(1),
(2) Date: Apr. 26, 2022

(87) PCT Pub. No.: WO2021/083639
PCT Pub. Date: May 6, 2021

(65) Prior Publication Data
US 2022/0397872 A1 Dec. 15, 2022

(30) Foreign Application Priority Data

Oct. 29, 2019 (EP) .................. 19205811

(51) Int. Cl.
*G05B 15/02* (2006.01)
(52) U.S. Cl.
CPC .................. *G05B 15/02* (2013.01)

(58) Field of Classification Search
CPC .................................. G05B 15/02
See application file for complete search history.

(56) References Cited

U.S. PATENT DOCUMENTS

| | | | | |
|---|---|---|---|---|
| 5,662,694 | A | * | 9/1997 | Lidman .............. A61N 1/37223 607/60 |
| 9,721,210 | B1 | * | 8/2017 | Brown ...................... G05F 5/00 |

(Continued)

FOREIGN PATENT DOCUMENTS

| CN | 101978402 A | 2/2011 |
|---|---|---|
| CN | 105229895 A | 1/2016 |

(Continued)

OTHER PUBLICATIONS

PCT International Search Report and Written Opinion of International Searching Authority mailed Jan. 26, 2021, corresponding to PCT International Application No. PCT/EP2020/078439.

*Primary Examiner* — Hien D Khuu
*Assistant Examiner* — Mohammed Shafayet
(74) *Attorney, Agent, or Firm* — Lempia Summerfield Katz LLC

(57) ABSTRACT

The invention relates to a method for controlling a sensor network (2) having sensor nodes (3) of a technical system (1). The method comprises the following steps: deactivating (S1) the sensor nodes (3) of the sensor network (2); determining (S2) an induction voltage ($U_e$) in a coil (4) of the sensor node (3) and/or a coil (4) of the sensor network (2), the induction voltage ($U_e$) being generated by a magnetic field generated by the technical system (1); comparing (S3) the determined induction voltage ($U_e$) with a reference voltage ($U_R$); and activating (S4) the sensor nodes (3) depending on the comparison. The invention further relates to a sensor network (2) of a technical system (1).

9 Claims, 3 Drawing Sheets

(56) References Cited

U.S. PATENT DOCUMENTS

| | | | | |
|---|---|---|---|---|
| 2004/0263183 A1* | 12/2004 | Naidu | ............. | G01R 31/52 |
| | | | | 324/536 |
| 2005/0145620 A1* | 7/2005 | Bartz | ............. | H05B 6/06 |
| | | | | 219/663 |
| 2007/0177414 A1* | 8/2007 | Funato | ............. | G01R 29/0878 |
| | | | | 365/36 |
| 2011/0064026 A1* | 3/2011 | Niedermeier | ............. | H04L 67/125 |
| | | | | 370/328 |
| 2011/0137440 A1* | 6/2011 | Ni | ............. | H04M 1/72403 |
| | | | | 700/94 |
| 2012/0242263 A1* | 9/2012 | Claus | ............. | G01D 5/145 |
| | | | | 318/400.04 |
| 2013/0141117 A1* | 6/2013 | Nikolenko | ............. | G01R 27/16 |
| | | | | 324/655 |
| 2014/0132418 A1* | 5/2014 | Lill | ............. | G05B 19/0428 |
| | | | | 340/679 |
| 2014/0239732 A1 | 8/2014 | Mach et al. | | |
| 2016/0273941 A1 | 9/2016 | Hackner et al. | | |
| 2018/0316229 A1* | 11/2018 | Anwer | ............. | H02J 50/60 |

FOREIGN PATENT DOCUMENTS

| | | |
|---|---|---|
| DE | 102015224831 A1 | 6/2017 |
| JP | 2011131643 A | 7/2011 |
| JP | 2014087217 A | 5/2014 |
| WO | 2009115448 A1 | 9/2009 |
| WO | 2014057343 A1 | 4/2014 |
| WO | 2015078854 A1 | 6/2015 |

\* cited by examiner

INDUCED VOLTAGE-BASED CONTROL OF A SENSOR NETWORK

CROSS REFERENCE TO RELATED APPLICATIONS

This present patent document is a § 371 nationalization of PCT Application Serial Number PCT/EP2020/078439 filed Oct. 9, 2020, designating the United States, which is hereby incorporated in its entirety by reference. This patent document also claims the benefit of EP19205811.3 filed on Oct. 29, 2019, which is also hereby incorporated in its entirety by reference.

FIELD

Embodiments relate to a method for controlling a sensor network including sensor nodes of a technical system.

BACKGROUND

It is advantageous to monitor machines and technical systems continuously or cyclically. In the context of digitalization, increasingly physical variables of machines and technical systems are detected. The measurement of physical variables such as temperature, vibration, pressure, humidity etc. is increasingly implemented by battery-operated sensor nodes with wireless communication (for example, Bluetooth Low Energy (BLE)). The sensor nodes detect the measurement data cyclically. In order to save energy, the sensor node is in a quiescent state between the cyclical measurements. Most functions are deactivated, as a result of which no measured value detection is possible. If a sudden event occurs in the quiescent state that is of high significance and therefore represents an important event in terms of measurement technology, this cannot be detected by the sensor node.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a solution for improved monitoring of technical systems.

Embodiments provide controlling of a sensor network including sensor nodes of a technical system in such a way that the sensor nodes are only activated when a magnetic field induced by the technical system, in the form of an induced voltage, may be determined. In addition, the activation of the sensor nodes may be performed in frequency-selective fashion.

Embodiments provide a method for controlling a sensor network including sensor nodes of a technical system, including the following steps: a deactivation of the sensor nodes of the sensor network, a determination of an induced voltage in a coil (for example in an air-core inductor) of the sensor node and/or the sensor network, wherein the induced voltage is induced by a magnetic field induced by the technical system, a comparison of the determined induced voltage with a reference voltage, and an activation of the sensor nodes depending on the comparison (for example by a reactivation pulse).

A circuit/control of a sensor network is provided that uses a coil (for example an air-core inductor, a coil with a soft iron core or a coil with a dielectric) as a sensor element. A magnetic field that passes through the coil induces a voltage in the coil that is referred to as an induced voltage. The induced voltage may be compared with a reference voltage, for example, with the aid of a comparator or Schmitt trigger. If the induced voltage exceeds the reference voltage, the output of the Schmitt trigger may be switched over from a low signal level to a high signal level, with the result that an interrupt may be triggered at a microcontroller.

The comparison of the determined induced voltage with the reference voltage may take place in analog or digital form. Digitally, the comparison of the determined induced voltage with the reference voltage may take place, for example, by virtue of the induced voltage being digitized and mathematically compared with a numerical value. The numerical value represents the reference voltage.

In an embodiment, the method further includes an amplification of the induced voltage by an operational amplifier after the determination of the induced voltage and before the comparison of the induced voltage with the reference voltage. An amplification of the induced voltage includes the advantage that the induced voltage may thus be determined more easily.

In an embodiment, the method further includes a filtering of the induced voltage using a suitable filter (for example a low-pass filter, a high-pass filter, or a bandpass filter) to a preset frequency range after the determination of the induced voltage and before the comparison of the induced voltage with the reference voltage. A filtering of the induced voltage includes the advantage that frequency ranges that are particularly relevant in the existing technical system may be selected.

In an embodiment, the method further includes a filtering of the induced voltage using a filter to a preset frequency range after the amplification of the induced voltage by the operational amplifier and before the comparison of the induced voltage with the reference voltage. A filtering of the induced voltage includes the advantage that frequency ranges that are particularly relevant in the existing technical system may be selected.

In a further embodiment, the preset frequency range is selected depending on characteristics of the technical system.

By the filter, it is possible to make the reactivation pulse (the activation of the sensor nodes depending on the comparison) frequency dependent. If the sensor nodes are only intended to be reactivated/activated when the technical system to be monitored or a machine of the technical system emits a characteristic magnetic field in a specific frequency range, the filter may be dimensioned so as to include a small band around the corresponding frequency range. All remaining frequencies are filtered out by the filter, as a result of which the sensor nodes are not reactivated/activated.

In an embodiment, the comparison may be performed by a comparison unit. The comparison unit is a comparator and/or a Schmitt trigger.

In an embodiment, the reactivation of the sensor nodes is performed when the induced voltage is greater than the reference voltage.

In an embodiment, the sensor nodes detect measurement data. The measurement data are transmitted to an evaluation unit by a wireless communication technology (for example Bluetooth Low Energy (BLE)). The measurement data may be analyzed in the evaluation unit.

Embodiments provide a sensor network of a technical system, including: sensor nodes, wherein the sensor nodes are deactivatable and activatable, a coil (for example an air-core inductor), wherein an induced voltage may be induced in the coil, wherein the induced voltage is induced by a magnetic field induced by the technical system, a determination unit, wherein the determination unit is configured to determine the induced voltage induced in the coil, a comparison unit, wherein the comparison unit is configured to perform a comparison of the induced voltage with a reference voltage, and a monitoring unit, wherein the monitoring unit is configured to perform a deactivation and activation of the sensor nodes of the sensor network depending on the comparison.

In an embodiment, the sensor network is configured to implement a method as described herein.

In an embodiment, the sensor nodes include an electrical energy store. The sensor nodes may be battery-operated or rechargeable battery-operated, for example.

In an embodiment, the technical system includes machines. The sensor nodes detect physical variables of the machines.

In an embodiment, the physical variables include temperature, vibration, pressure and/or humidity.

Embodiments provide the advantage that sensor nodes may be set to a quiescent state by a deactivation as soon as a technical system and/or an (electric) machine of a technical system is switched off. Renewed switching-on of the technical system and/or the (electric) machine of the technical system may be determined by an induced voltage induced in a coil, and the sensor nodes may be activated again/reactivated. The induced voltage is in this case induced by a magnetic field induced by the technical system and/or an (electric) machine of a technical system. This method essentially contributes to an energy saving, for example in the battery operation mode. As a result, the battery/rechargeable battery life may be markedly extended and thus the costs for servicing may be substantially reduced.

DETAILED DESCRIPTION

Figure 1:
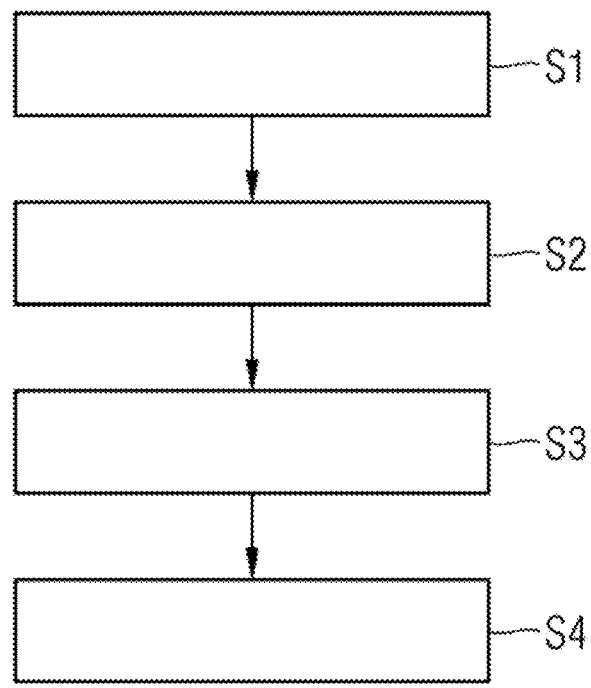
FIG. 1 depicts a flowchart of the method according to an embodiment.

FIG. 1 depicts a flowchart of a method for controlling a sensor network 2 including sensor nodes 3 of a technical system 1. The method includes the following acts:

S1: a deactivation of the sensor nodes 3 of the sensor network 2, S2: a determination of an induced voltage $U_e$ in a coil 4 (for example an air-core inductor) of a sensor node 3 and/or the sensor network 2, wherein the induced voltage $U_e$ is induced by a magnetic field induced by the technical system 1, S3: a comparison of the determined induced voltage $U_e$ with a reference voltage $U_R$, and S4: an activation of the sensor nodes 3 depending on the comparison.

The method may also include the following act: an amplification of the induced voltage $U_e$ by an operational amplifier after the determination of the induced voltage $U_e$ and before the comparison of the induced voltage $U_e$ with the reference voltage $U_R$.

The method may also include the following act: a filtering of the induced voltage $U_e$ using a filter to a preset frequency range after the determination of the induced voltage $U_e$ or after the amplification of the induced voltage $U_e$ by the operational amplifier and before the comparison of the induced voltage $U_e$ with the reference voltage $U_R$.

The preset frequency range may be selected depending on characteristics of the technical system 1.

The reactivation of the sensor nodes 3 is performed depending on the comparison of the determined induced voltage $U_e$ with the reference voltage $U_R$. When the induced voltage ($U_e$) is, for example, greater than the reference voltage ($U_R$), the reactivation of the sensor nodes 3 may be performed.

Figure 2:
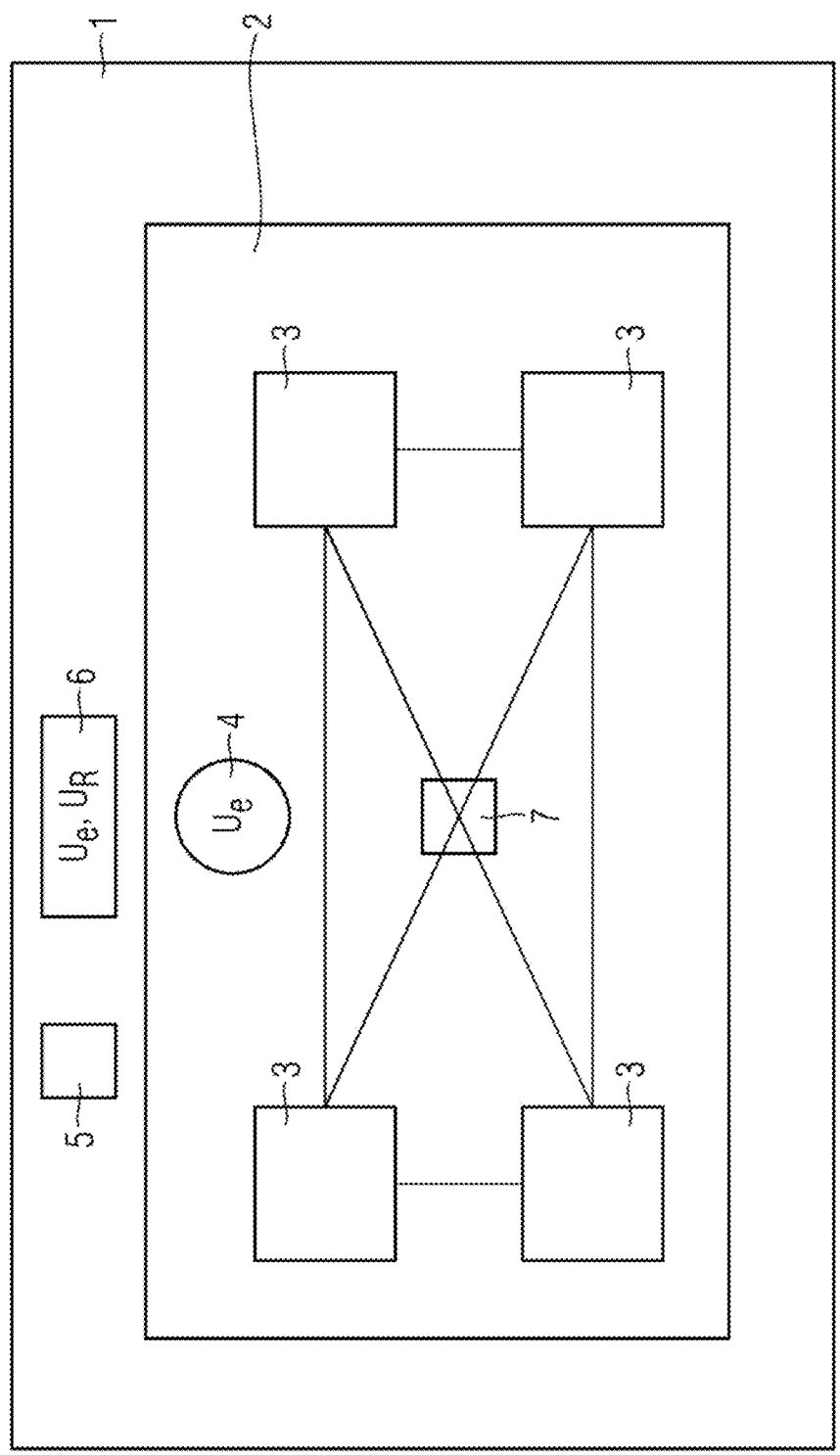
FIG. 2 depicts a block diagram of a sensor network according to an embodiment.

FIG. 2 depicts a block diagram of a sensor network 2 of a technical system 1. The sensor network 2 includes sensor nodes 3, wherein the sensor nodes 3 are deactivatable and activatable.

The sensor nodes 3 may have an electrical energy store.

The sensor nodes 3 may detect measurement data. The measurement data may be transmitted to an evaluation unit by a wireless communication technology.

The sensor network 2 (or one of the sensor nodes 3) also includes a coil 4. An induced voltage $U_e$ may be induced in the coil 4, wherein the induced voltage $U_e$ is induced by a magnetic field induced by the technical system 1.

The sensor network 2 also includes a determination unit 5. The determination unit 5 is configured to determine the induced voltage $U_e$ induced in the coil 4.

The sensor network 2 also includes a comparison unit 6. The comparison unit 6 is configured to perform a comparison of the induced voltage $U_e$ with a reference voltage $U_R$.

The comparison unit 6 may be a comparator and/or a Schmitt trigger.

The sensor network 2 also includes a monitoring unit 7. The monitoring unit 7 is configured to perform a deactivation and activation of the sensor nodes 3 of the sensor network 2 depending on the comparison.

Figure 3:
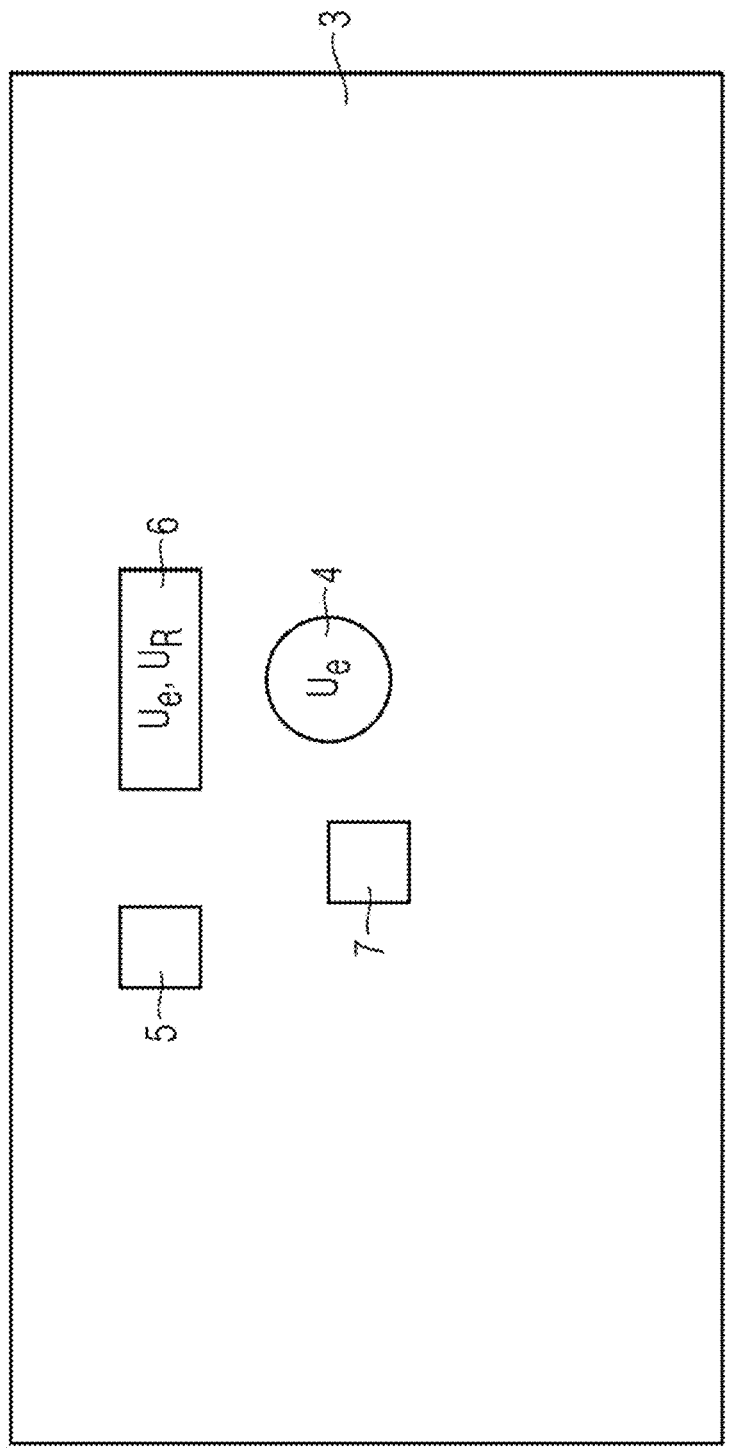
FIG. 3 depicts a sensor node according to an embodiment.

Alternatively, the coil 4, the determination unit 4, the comparison unit 6 and the monitoring unit 7 may also be formed/integrated directly in the sensor nodes 3 (see FIG. 3).

The technical system 1 may include machines. The sensor nodes 3 detect physical variables of the machines.

The physical variables may include a present temperature, a present vibration, a present pressure and/or a present humidity.

FIG. 3 depicts a sensor node 3. The sensor node includes a coil 4, a determination unit 4, a comparison unit 6 and a monitoring unit 7. In contrast to in FIG. 2, the coil 4, the determination unit 4, the comparison unit 6 and the monitoring unit 7 are formed/integrated directly in the sensor node 3 and not in the sensor network 2.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for controlling a sensor network comprising one or more sensor nodes of a technical system, the method comprising:
   deactivating a sensor node of the one or more sensor nodes of the sensor network;
   determining an induced voltage in a coil of the sensor node of the one or more sensor nodes, wherein the induced voltage is induced by a magnetic field induced by the technical system;
   amplifying the determined induced voltage by an operational amplifier;
   filtering, by a filter, the amplified induced voltage to a preset frequency range, wherein the preset frequency range is selected depending on the technical system that emits a characteristic magnetic field in the preset frequency range;
   comparing the filtered induced voltage with a reference voltage; and
   activating the sensor node based on the comparison.

2. The method of claim 1, wherein the comparison is performed by a comparison unit, wherein the comparison unit is a comparator or a Schmitt trigger.

3. The method of claim 1, wherein activating the sensor node is performed when the filtered induced voltage is greater than the reference voltage.

4. The method of claim 1, wherein the one or more sensor nodes are configured to detect measurement data, wherein the measurement data are transmitted to an evaluation unit by a wireless communication technology.

5. A sensor network of a technical system, the sensor network comprising:
   one or more sensor nodes, wherein the one or more sensor nodes are deactivatable and activatable;
   a coil, wherein the coil is configured such that an induced voltage can be induced in the coil;
   a determination unit configured to determine the induced voltage induced in the coil, wherein the induced voltage is induced by a magnetic field induced by the technical system;
   an operational amplifier configured to amplify the determined induced voltage;
   a filter configured to filter the amplified induced voltage to a preset frequency range, wherein the preset frequency range is selected depending on the technical system that emits a characteristic magnetic field in the preset frequency range;
   a comparison unit configured to perform a comparison of the filtered induced voltage with a reference voltage; and
   a monitoring unit configured to perform a deactivation and activation of all of the one or more sensor nodes of the sensor network depending on the comparison.

6. The sensor network of claim 5, wherein the one or more sensor nodes include an electrical energy store.

7. The sensor network of claim 5, wherein the technical system includes one or more machines, wherein the one or more sensor nodes are configured to detect physical variables of the one or more machines.

8. The sensor network of claim 7, wherein the physical variables include at least one of temperature, vibration, pressure, or humidity.

9. The sensor network of claim 7, wherein the coil comprises an air-core inductor.

* * * * *